(12) United States Patent
Ho et al.

(10) Patent No.: US 10,444,441 B1
(45) Date of Patent: Oct. 15, 2019

(54) PIVOTABLE HOUSING FOR A FIBER OPTIC CONNECTOR

(71) Applicant: Senko Advanced Components, Inc., Marlborough, MA (US)

(72) Inventors: Neal Man Ming Ho, Kowloon (HK); Kimman Wong, Kowloon (HK)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/100,784

(22) Filed: Aug. 10, 2018

(51) Int. Cl.
*G02B 6/38* (2006.01)

(52) U.S. Cl.
CPC ................................. *G02B 6/387* (2013.01)

(58) Field of Classification Search
CPC ........................................................ G02B 6/387
USPC ............................................................. 385/76
See application file for complete search history.

(56) References Cited

U.S. PATENT DOCUMENTS

| | | | |
|---|---|---|---|
| 4,150,790 A | 4/1979 | Potter | |
| 4,327,964 A | 8/1982 | Haesley et al. | |
| 4,478,473 A | 10/1984 | Frear | |
| 4,762,388 A | 8/1988 | Tanaka et al. | |
| 4,764,129 A | 8/1988 | Jones et al. | |
| 4,840,451 A | 6/1989 | Sampson et al. | |
| 4,872,736 A | 10/1989 | Myers et al. | |
| 4,979,792 A | 12/1990 | Weber et al. | |
| 5,041,025 A | 8/1991 | Haitmanek | |
| D323,143 S | 1/1992 | Ohkura et al. | |
| 5,212,752 A | 5/1993 | Stephenson et al. | |
| 5,265,181 A | 11/1993 | Chang | |
| 5,289,554 A | 2/1994 | Cubukciyan et al. | |
| 5,317,663 A | 5/1994 | Beard et al. | |
| 5,335,301 A | 5/1994 | Newman et al. | |
| 5,348,487 A | 9/1994 | Marazzi et al. | |
| 5,363,460 A * | 11/1994 | Marazzi | G02B 6/3825 385/55 |
| 5,444,806 A | 8/1995 | deMarchi et al. | |
| 5,481,634 A | 1/1996 | Anderson et al. | |
| 5,506,922 A | 4/1996 | Grois et al. | |
| 5,521,997 A | 5/1996 | Rovenolt et al. | |
| 5,570,445 A | 10/1996 | Chou et al. | |
| 5,588,079 A | 12/1996 | Tanabe et al. | |
| 5,684,903 A | 11/1997 | Kyomasu et al. | |
| 5,687,268 A | 11/1997 | Stephenson et al. | |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.

(Continued)

*Primary Examiner* — Akm E Ullah
(74) *Attorney, Agent, or Firm* — Edward S. Jarmolowicz, Esq.

(57) ABSTRACT

A fiber optic connector having an upper housing and a lower housing, upper housing at one end is on a pivot point to be move up and away from said lower housing allowing access to internal components of connector, the upper housing is configured with a latch to secure to lower housing to enclose internal components.

9 Claims, 5 Drawing Sheets

(56) References Cited

U.S. PATENT DOCUMENTS

| | | | |
|---|---|---|---|
| 5,781,681 A | 7/1998 | Manning | |
| 5,937,130 A | 8/1999 | Amberg et al. | |
| 5,956,444 A | 9/1999 | Duda et al. | |
| 5,971,626 A | 10/1999 | Knodell et al. | |
| 6,041,155 A | 3/2000 | Anderson et al. | |
| 6,049,040 A | 4/2000 | Biles et al. | |
| 6,079,881 A * | 6/2000 | Roth | G02B 6/3825 385/139 |
| 6,134,370 A | 10/2000 | Childers et al. | |
| 6,178,283 B1 | 1/2001 | Weigel | |
| RE37,080 E | 3/2001 | Stephenson et al. | |
| 6,206,577 B1 | 3/2001 | Hall, III et al. | |
| 6,206,581 B1 | 3/2001 | Driscoll et al. | |
| 6,227,717 B1 | 5/2001 | Ott et al. | |
| 6,238,104 B1 | 5/2001 | Yamakawa et al. | |
| 6,247,849 B1 | 6/2001 | Liu | |
| 6,364,537 B1 | 4/2002 | Maynard | |
| 6,461,054 B1 | 10/2002 | Iwase | |
| 6,471,412 B1 | 10/2002 | Belenkiy et al. | |
| 6,478,472 B1 | 11/2002 | Anderson et al. | |
| 6,551,117 B2 | 4/2003 | Poplawski et al. | |
| 6,579,014 B2 | 6/2003 | Melton et al. | |
| 6,634,801 B1 | 10/2003 | Waldron et al. | |
| 6,648,520 B2 | 11/2003 | McDonald et al. | |
| 6,682,228 B2 | 1/2004 | Rathnam et al. | |
| 6,685,362 B2 | 2/2004 | Burkholder et al. | |
| 6,695,486 B1 | 2/2004 | Falkenberg | |
| 6,854,894 B1 | 2/2005 | Yunker et al. | |
| 6,872,039 B2 | 3/2005 | Baus et al. | |
| 6,935,789 B2 | 8/2005 | Gross, III et al. | |
| 7,091,421 B2 | 5/2006 | Kukita et al. | |
| 7,090,406 B2 | 8/2006 | Melton et al. | |
| 7,090,407 B2 | 8/2006 | Melton et al. | |
| 7,111,990 B2 | 9/2006 | Melton et al. | |
| 7,113,679 B2 | 9/2006 | Melton et al. | |
| D533,504 S | 12/2006 | Lee | |
| D534,124 S | 12/2006 | Taguchi | |
| 7,150,567 B1 | 12/2006 | Luther et al. | |
| 7,153,041 B2 | 12/2006 | Mine et al. | |
| 7,198,409 B2 | 4/2007 | Smith et al. | |
| 7,207,724 B2 | 4/2007 | Gurreri | |
| D543,146 S | 5/2007 | Chen et al. | |
| 7,258,493 B2 | 8/2007 | Milette | |
| 7,281,859 B2 | 10/2007 | Mudd et al. | |
| D558,675 S | 1/2008 | Chien et al. | |
| 7,315,682 B1 | 1/2008 | En Lin et al. | |
| 7,325,976 B2 | 2/2008 | Gurreri et al. | |
| 7,325,980 B2 | 2/2008 | Pepe | |
| 7,329,137 B2 | 2/2008 | Martin et al. | |
| 7,331,718 B2 | 2/2008 | Yazaki et al. | |
| 7,354,291 B2 | 4/2008 | Caveney et al. | |
| 7,371,082 B2 | 5/2008 | Zimmell et al. | |
| 7,387,447 B2 | 6/2008 | Mudd et al. | |
| 7,390,203 B2 | 6/2008 | Murano et al. | |
| D572,661 S | 7/2008 | En Lin et al. | |
| 7,431,604 B2 | 10/2008 | Waters et al. | |
| 7,463,803 B2 | 12/2008 | Cody et al. | |
| 7,465,180 B2 | 12/2008 | Kusuda et al. | |
| 7,510,335 B1 | 3/2009 | Su et al. | |
| 7,513,695 B1 | 4/2009 | Lin et al. | |
| 7,561,775 B2 | 7/2009 | Lin et al. | |
| 7,591,595 B2 | 9/2009 | Lu et al. | |
| 7,594,766 B1 | 9/2009 | Sasser et al. | |
| 7,641,398 B2 | 1/2010 | O'Riorden et al. | |
| 7,695,199 B2 | 4/2010 | Teo et al. | |
| 7,699,533 B2 | 4/2010 | Milette | |
| 7,824,113 B2 | 11/2010 | Wong et al. | |
| 7,837,395 B2 | 11/2010 | Lin et al. | |
| D641,708 S | 7/2011 | Yamauchi | |
| 8,186,890 B2 | 5/2012 | Lu | |
| 8,192,091 B2 | 6/2012 | Hsu et al. | |
| 8,202,009 B2 | 6/2012 | Lin et al. | |
| 8,251,733 B2 | 8/2012 | Wu | |
| 8,267,595 B2 | 9/2012 | Lin et al. | |
| 8,270,796 B2 | 9/2012 | Nhep | |
| 8,408,815 B2 | 4/2013 | Lin et al. | |
| 8,465,317 B2 | 6/2013 | Gniadek et al. | |
| 8,636,424 B2 | 1/2014 | Kuffel et al. | |
| 8,651,749 B2 | 2/2014 | Dainese Junior et al. | |
| 8,770,863 B2 | 7/2014 | Cooke et al. | |
| 9,411,110 B2 | 8/2016 | Barnette et al. | |
| 9,494,744 B2 | 11/2016 | de Jong | |
| 9,548,557 B2 | 1/2017 | Liu | |
| 9,551,842 B2 | 1/2017 | Theuerkorn | |
| 9,568,686 B2 | 2/2017 | Fewkes et al. | |
| 9,581,768 B1 | 2/2017 | Baca et al. | |
| 9,599,778 B2 | 3/2017 | Wong | |
| 9,678,283 B1 * | 6/2017 | Chang | G02B 6/3831 |
| 9,684,313 B2 | 6/2017 | Cline et al. | |
| 9,709,753 B1 | 7/2017 | Chang et al. | |
| 9,726,830 B1 | 8/2017 | Gniadek | |
| 10,228,521 B2 * | 3/2019 | Gniadek | G02B 6/3893 |
| 2002/0172467 A1 | 11/2002 | Anderson et al. | |
| 2003/0053787 A1 | 3/2003 | Lee | |
| 2003/0157825 A1 | 8/2003 | Kane | |
| 2004/0052473 A1 | 3/2004 | Seo et al. | |
| 2004/0136657 A1 | 7/2004 | Ngo | |
| 2004/0141693 A1 | 7/2004 | Szilagyi et al. | |
| 2004/0161958 A1 | 8/2004 | Togami et al. | |
| 2004/0234209 A1 | 11/2004 | Cox et al. | |
| 2005/0111796 A1 | 5/2005 | Matasek et al. | |
| 2005/0141817 A1 | 6/2005 | Yazaki et al. | |
| 2006/0089049 A1 | 4/2006 | Sedor | |
| 2006/0127025 A1 | 6/2006 | Haberman | |
| 2006/0160429 A1 | 7/2006 | Dawiedczyk et al. | |
| 2006/0269194 A1 | 11/2006 | Luther et al. | |
| 2006/0274411 A1 | 12/2006 | Yamauchi | |
| 2007/0028409 A1 | 2/2007 | Yamada | |
| 2007/0079854 A1 | 4/2007 | You | |
| 2007/0098329 A1 | 5/2007 | Shimoji et al. | |
| 2007/0149062 A1 | 6/2007 | Long et al. | |
| 2007/0232115 A1 | 10/2007 | Burke et al. | |
| 2007/0243749 A1 | 10/2007 | Wu | |
| 2008/0008430 A1 | 1/2008 | Kewitsch | |
| 2008/0044137 A1 | 2/2008 | Luther et al. | |
| 2008/0069501 A1 | 3/2008 | Mudd et al. | |
| 2008/0089649 A1 * | 4/2008 | Wang | G02B 6/3897 385/56 |
| 2008/0101757 A1 | 5/2008 | Lin et al. | |
| 2008/0226237 A1 | 9/2008 | O'Riorden et al. | |
| 2008/0267566 A1 | 10/2008 | Lin et al. | |
| 2009/0022457 A1 | 1/2009 | De Jong et al. | |
| 2009/0028507 A1 | 1/2009 | Jones et al. | |
| 2009/0092360 A1 | 4/2009 | Lin et al. | |
| 2009/0196555 A1 | 8/2009 | Lin et al. | |
| 2009/0214162 A1 | 8/2009 | O'Riorden et al. | |
| 2009/0220197 A1 | 9/2009 | Gniadek | |
| 2009/0290938 A1 | 11/2009 | Lin et al. | |
| 2010/0034502 A1 | 2/2010 | Lu et al. | |
| 2010/0247041 A1 | 9/2010 | Szilagyi | |
| 2010/0322561 A1 | 12/2010 | Lin et al. | |
| 2011/0044588 A1 | 2/2011 | Larson et al. | |
| 2011/0131801 A1 | 6/2011 | Nelson et al. | |
| 2011/0177710 A1 | 7/2011 | Tobey | |
| 2012/0052714 A1 * | 3/2012 | Zerebilov | H01R 13/6275 439/370 |
| 2012/0058665 A1 * | 3/2012 | Zerebilov | H01R 13/6275 439/370 |
| 2012/0099822 A1 | 4/2012 | Kuffel et al. | |
| 2012/0155810 A1 | 6/2012 | Nakagawa | |
| 2012/0189260 A1 | 7/2012 | Kowalczyk et al. | |
| 2012/0269485 A1 | 10/2012 | Haley et al. | |
| 2012/0301080 A1 | 11/2012 | Gniadek | |
| 2013/0071067 A1 | 3/2013 | Lin | |
| 2013/0089995 A1 | 4/2013 | Gniadek et al. | |
| 2013/0094816 A1 | 4/2013 | Lin et al. | |
| 2013/0121653 A1 | 5/2013 | Shitama et al. | |
| 2013/0183012 A1 | 7/2013 | Cabanne Lopez et al. | |
| 2013/0259429 A1 | 10/2013 | Czosnowski et al. | |
| 2013/0322825 A1 | 12/2013 | Cooke et al. | |
| 2014/0016901 A1 | 1/2014 | Lambourn et al. | |
| 2014/0023322 A1 | 1/2014 | Gniadek et al. | |
| 2014/0050446 A1 | 2/2014 | Chang | |

(56) References Cited

U.S. PATENT DOCUMENTS

| | | |
|---|---|---|
| 2014/0064676 A1* | 3/2014 | McColloch ............ G02B 6/425 385/92 |
| 2014/0133808 A1 | 5/2014 | Hill et al. |
| 2014/0219621 A1 | 8/2014 | Barnette et al. |
| 2014/0226946 A1 | 8/2014 | Cook et al. |
| 2014/0241678 A1 | 8/2014 | Brinquier et al. |
| 2014/0241688 A1 | 8/2014 | Isenhour et al. |
| 2014/0334780 A1 | 11/2014 | Nguyen et al. |
| 2014/0348477 A1 | 11/2014 | Chang |
| 2015/0301294 A1 | 10/2015 | Chang |
| 2015/0355417 A1 | 10/2015 | Takano |
| 2015/0331201 A1 | 11/2015 | Takano et al. |
| 2015/0346450 A1* | 12/2015 | Barnes, Jr. ............ G02B 6/445 385/135 |
| 2015/0378113 A1 | 12/2015 | Good et al. |
| 2016/0172852 A1 | 6/2016 | Takano |
| 2016/0291262 A1 | 6/2016 | Chang |
| 2016/0195682 A1 | 7/2016 | Takano |
| 2016/0231512 A1* | 8/2016 | Seki .................... G02B 6/3893 |
| 2016/0259135 A1 | 9/2016 | Gniadek et al. |
| 2016/0266326 A1 | 9/2016 | Gniadek |
| 2016/0320572 A1 | 11/2016 | Gniadek |
| 2016/0131849 A1 | 12/2016 | Takano |
| 2017/0003458 A1 | 1/2017 | Gniadek |
| 2018/0081124 A1 | 3/2018 | Nguyen et al. |
| 2018/0156988 A1 | 6/2018 | Gniadek |
| 2018/0275351 A1* | 9/2018 | Parikh .................. G02B 6/3887 |

FOREIGN PATENT DOCUMENTS

| | | |
|---|---|---|
| CN | 201383588 Y | 1/2010 |
| CN | 202600189 U | 12/2012 |
| DE | 202006011910 U1 | 4/2007 |
| DE | 102006019335 A1 | 10/2007 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009229545 A | 10/2009 |
| JP | 2009276493 A | 11/2009 |
| TW | 200821653 A | 5/2008 |
| WO | 2001/79904 A2 | 10/2001 |
| WO | 2004/027485 A1 | 4/2004 |
| WO | 2008/112986 A1 | 9/2008 |
| WO | 2009/135787 A1 | 11/2009 |
| WO | 2010/024851 A2 | 3/2010 |
| WO | 2012/136702 A1 | 10/2012 |
| WO | 2012/162385 A1 | 11/2012 |
| WO | 2014/028527 A1 | 2/2014 |
| WO | 2014/182351 A1 | 11/2014 |
| WO | 2015/191024 A1 | 12/2015 |
| WO | 2016/148741 A1 | 9/2016 |

OTHER PUBLICATIONS

European Search Report and Written Opinion dated Feb. 19, 2015 for EP 14168005.
"Fiber Optic Connectors and Assemblies Catalog" 2009, Huber & Suhner Fiver Optics, Herisau, Switzerland, www.hubersuhner.com.
"Fiber Optic Interconnect Solutions, Tactical Fiber Optical Connectors, Cables and Termini" 2006, Glenair, Inc., Glendale, California, www.mps.electronics.de.
"Fiber Optic Products Catalog" Nov. 2007, Tyco Electronics Corporation, Harrisburg, Pennsylvania, www.ampnetconnect.com.
International Search Report and Written Opinion dated Apr. 27, 2012 for PCT/US2011/058799.
International Search Report and Written Opinion dated Aug. 27, 2012 for PCT/US2012/039126.
International Search Report and Written Opinion dated Jan. 16, 2014 for PCT/US2013/54784.
International Search Report and Written Opinion dated Oct. 9, 2014 for PCT/US2014/041500.
International Search Report and Written Opinion dated May 14, 2014 for PCT/US2014/012137.
International Search Report and Written Opinion dated Aug. 21, 2008 for PCT/US2008/057023.
International Preliminary Report on Patentability dated Aug. 22, 2016 from related International Application No. PCT/US2015/059458, International Filing Date Nov. 6, 2015.
International Search Report (ISR) WO2008112986 dated Sep. 15, 2009.
ISR WO2014028527ISR Feb. 20, 2014.
ISR WO2015US57610ISR Jan. 21, 2016.
ISR WO2016176083ISR May 19, 2016.

* cited by examiner

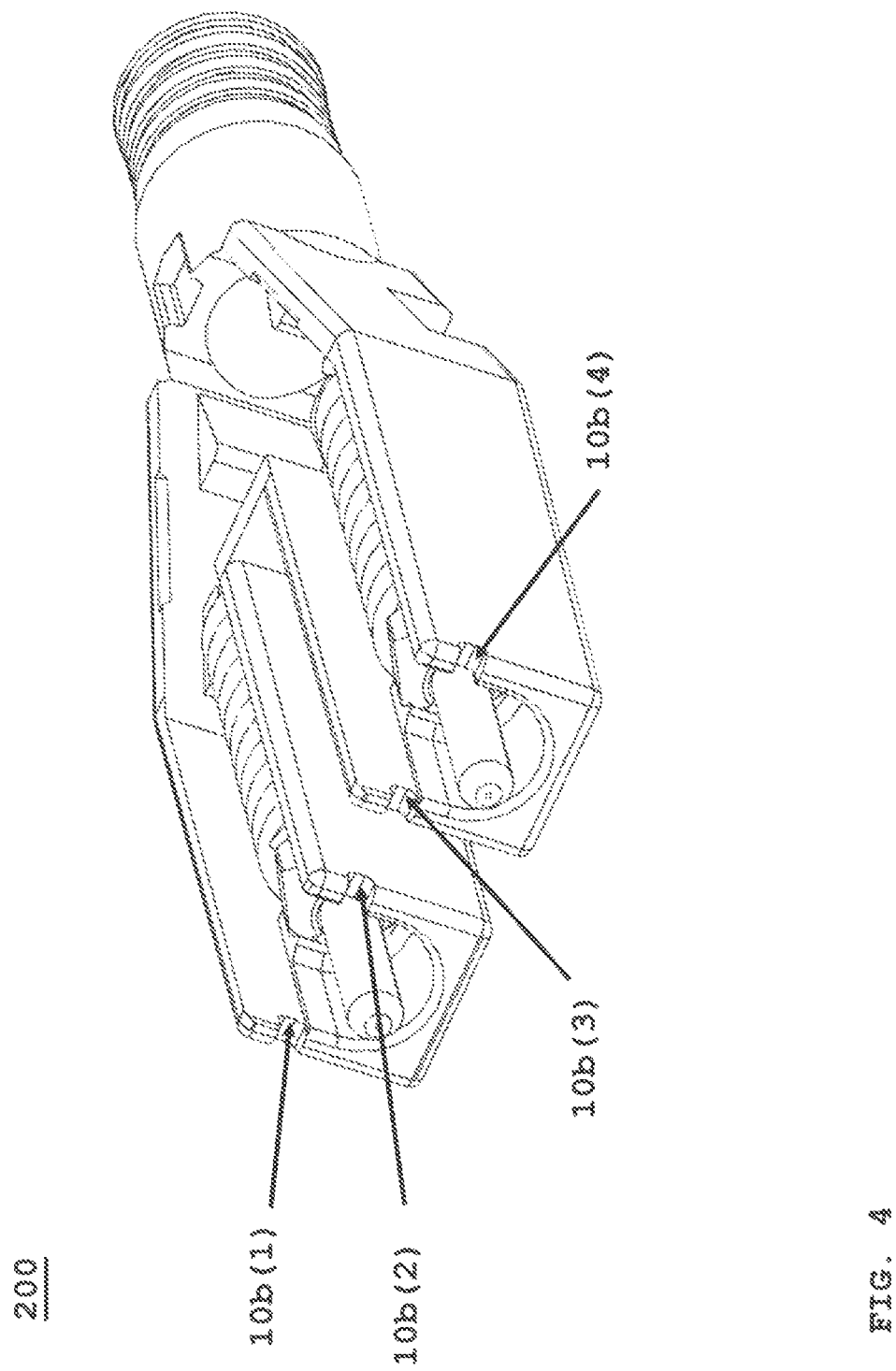

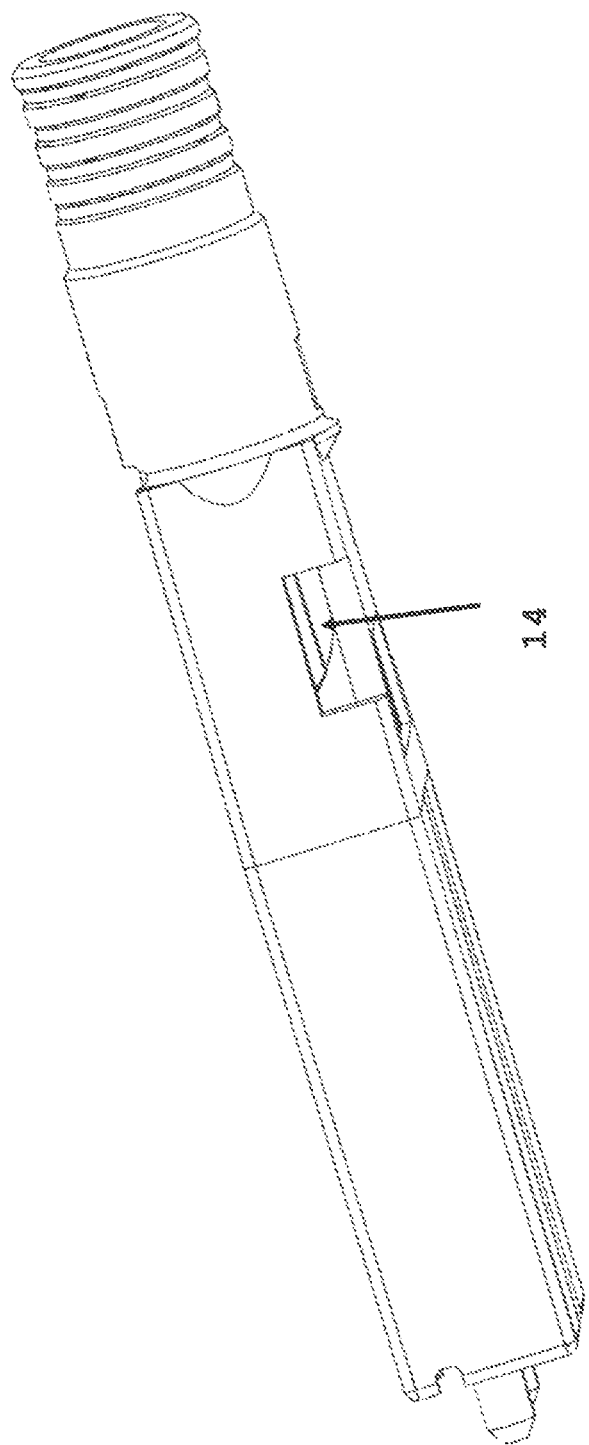

PIVOTABLE HOUSING FOR A FIBER OPTIC CONNECTOR

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCES TO RELATED APPLICATIONS

None.

FIELD OF THE INVENTION

The present invention relates to fiber optic connectors, and more particularly, to an outer housing for fiber optic connector that is retained and allows access to internal connector components such as bias springs, ferrules or fiber strands for improving assembly and reducing manufacturing cost.

BACKGROUND OF THE INVENTION

Modern high capacity optical systems often utilize fiber optic connectors for inter-system connection. As there are multiple connection points in an optical path, and a spring is typically required to bias forward a ferrule assembly, there is a need to simplify assembly of the fiber optic strands or cable containing multiple strands by having access to internal components without fully detaching connector housing.

SUMMARY OF THE INVENTION

According to the present invention, a fiber optic connector comprises a ferrule housing with at least on ferrule and at least one fiber optic strand. In a traditional LC fiber connector, as shown in FIG. 1, a single spring is configured to bias a ferrule forward in a housing that contains both. In the present invention, the housing top or bottom portion is configured to open on a hinge or similar pivot point to allow access to internal components.

In a prior art connector, a housing is separated to gain access to internal components. Referring to U.S. Pat. No. 9,678,263 titled Fiber Optic Connector Assemblies with Adjustable Polarity, Chang, and owned by the assignee of the present invention, at FIG. 1, plug frame 150a is secured within housing 180, and housing 180 is separated to gain access to plug frame 150a or plug frame 150b. Referring to Chang, FIG. 3A, housing 380 is separated to gain access to internal components.

In the present invention, a top housing is secured at a pivot point, allowing a user to gain access without removing fully disassembling the connector. So if a spring is damaged, or a ferrule face is scratched (introducing signal loss), the components can be replaced. Also, access allows one to change out ferrule assembly from male as shown in FIG. 1 of Chang to female, which is well-known in the prior art.

BRIEF DESCRIPTION OF THE DRAWINGS

Embodiments of the invention are described in more detail hereinafter with reference to the drawings, in which:

FIG. 4 is a front perspective view illustrating pivot-snap points for attaching outer housing of FIG. 3;

FIG. 5 is side perspective view illustrating catch recess to latch outer housing of FIG. 2 to lower housing of FIG. 3;

DETAILED DESCRIPTION

In the following description, apparatuses for assembling a fiber optic connector with a pivotable outer housing. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
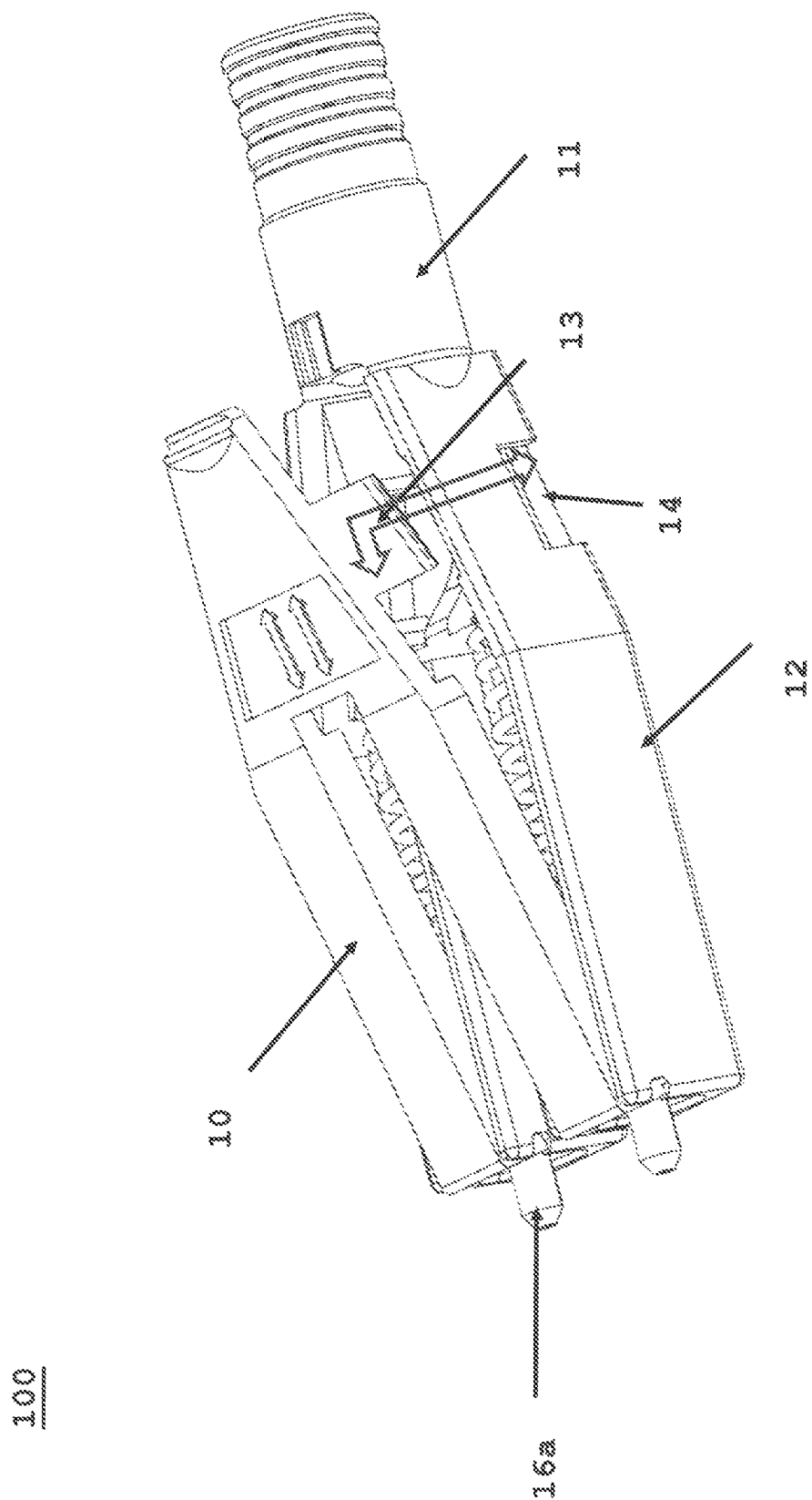
FIG. 1 is a perspective view of a male fiber optic connector with a pivotable outer or upper housing according to the present invention.

FIG. 1 depicts a male fiber optic connector (100) with a pivotable upper housing (10) secured at a proximal end of connector (100) or nearer ferrule (16a) (refer to FIG. 6). Upper housing (10) has a latch (13) for securing to lower housing (12) within latch catch or latch recess (14). A cable boot assembly (11) is secure to a distal end of connector (100)

Figure 2:
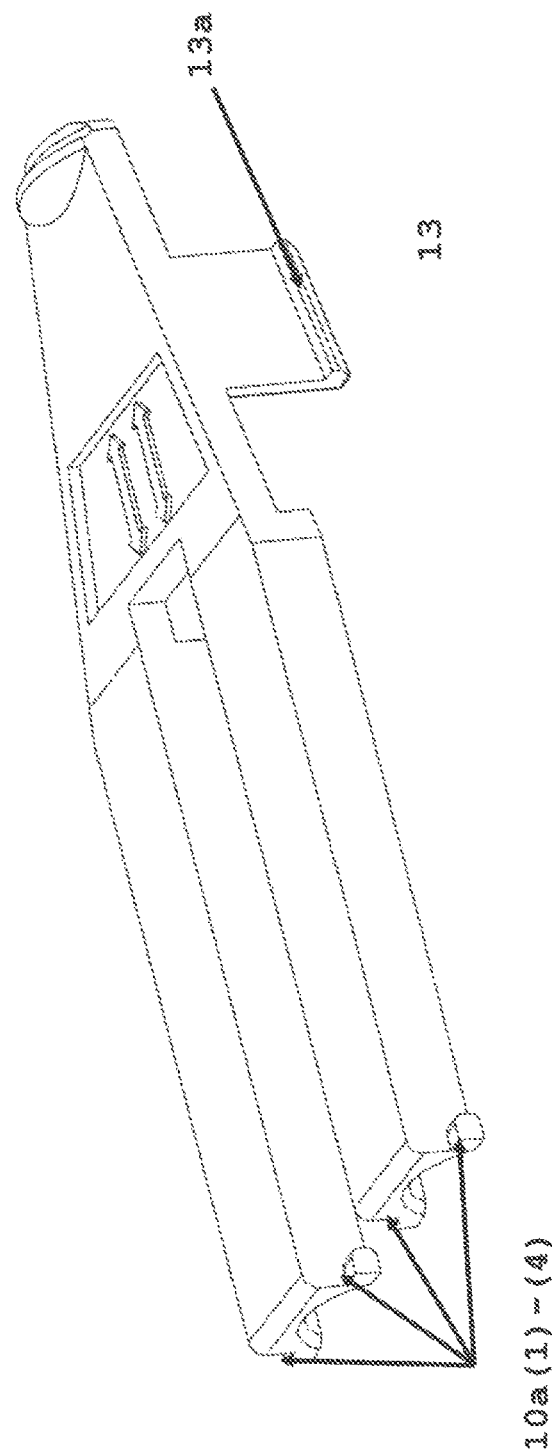
FIG. 2 is a perspective view of outer housing of the connector of FIG. 1.

FIG. 2 depicts pivotable upper housing (10), the housing (10) as plural of snaps (10(a) (1)-(4))), each snap corresponds to a recessed shoulder (10(b) (1)-(4))), (refer to FIG. 4 The shoulder is concaved to accept snap and allow upper housing (10) to pivot up and away exposing internal components such a spring (15), ferrule (16a) and ferrule flange (16b) (refer to FIG. 3) for assembly or repair as needed.

Figure 3:
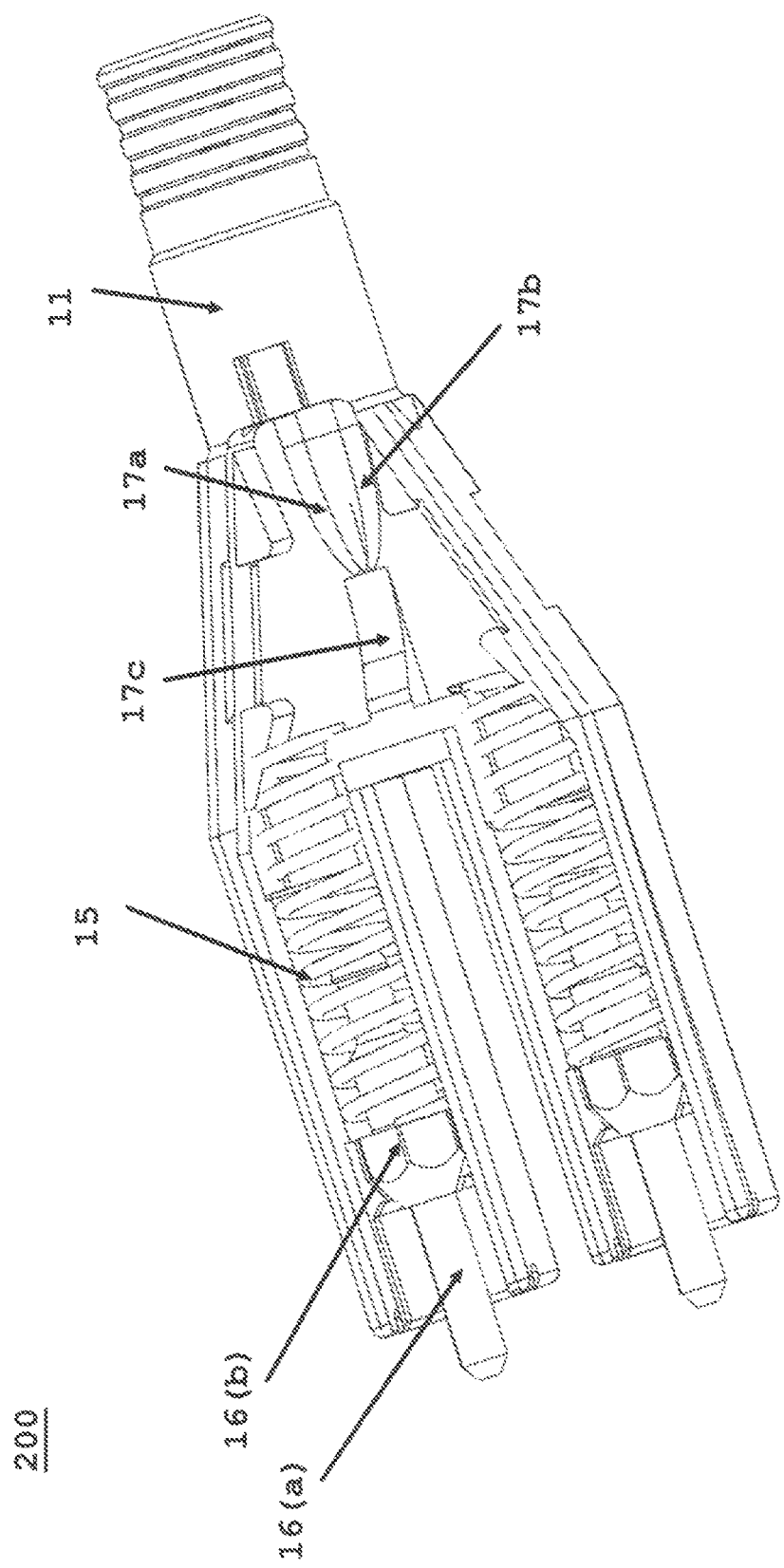
FIG. 3 is a perspective view lower housing of the connector of FIG. 1.

FIG. 3 depicts lower housing (12) without upper housing (10) attached. Internal components spring (15), ferrule assembly (16), and incoming fiber strands (17a, 17b) secured under pin (17) from cable boot assembly (11) are accessible when upper housing (10) is detached. As discussed, in the prior art the entire upper housing was removed. This may result in component loss, i.e. upper housing, or upon reattaching, upper housing may be misaligned binding or damaging connector.

FIG. 4 depicts lower housing (12) view from proximal end. A plural of concave recesses (10(b)(1)-(4))) are configured to accept and secure a corresponding snap (10(a) (1)-(4)) formed as bar, shaft or cam to be secured within recesses without easily detaching but also upper housing to be rotated up and away exposing the internal components of connector (100).

FIG. 5 depicts a side, bottom view of lower housing (12) with latch area (14) configured to secure upper housing (10) to lower housing (12) via latch 13 (FIG. 1), as lower housing (10) is depressed over lower housing (12), latch 13 is secured with opening (14) as shown by arrow "P", in FIG. 1. Referring to FIG. 5 and FIG. 2 together, latch (13) has a lip (13a) that will latch (13) is pressed into opening (14), and released, latch (13) has memory or is resilient, and lip (13a) is caught on corresponding lower housing wall structure to secure upper housing to lower housing to form connector housing or body.

An ordinarily skilled person in the art can appreciate that by following the principal of the present invention, a version of the adapter for mating a multi-diber optic ferrule connector with another multi-fiber optic ferrule connector can be derived without departing from the scope and spirit of the invention. Although the embodiments of the present invention described herein are related to multi-fiber optic applications, the present invention can be adapted to single fiber optic applications. Specific details may be omitted so as not to obscure the invention; however, the disclosure is written to enable one skilled in the art to practice the teachings herein without undue experimentation.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A fiber optic connector body comprising:
   an upper housing and a lower housing forms said connector body;
   said body contains at least one ferrule therein;
   said upper housing has two or more snaps at a proximal end;
   said lower housing has a corresponding receiving surface that is configured to accept said snap allowing upper housing to pivot up and away from lower housing for accessing said ferrule;
   said lower housing further comprises at least one opening near a distal end of the lower housing;
   said upper housing further comprises at least one latch near a distal end of the upper housing; and wherein
   said latch is secured into said opening resulting in said upper and said lower housing forming said connector body for protecting said ferrule.

2. A fiber optic connector body of claim 1, wherein connector is a LC type, SC type, or MPO type.

3. A fiber optic connector body of claim 1, wherein connector housing body further contains a spring, ferrule flange and fiber optic strands.

4. A fiber optic connector body of claim 1, wherein upper housing has one or more latches at a distal end of upper housing configured to secure upper housing to lower housing.

5. A fiber optic connector body of claim 4, wherein lower housing has one or more an openings configured to receive latch to secure upper and lower housing together to form the connector body.

6. A fiber optic connector body of claim 1, wherein said receiving surface is a cam surface.

7. A fiber optic connector body of claim 1, wherein said latch further comprises a lip for securing said latch with said opening.

8. A fiber optic connector body of claim 1, wherein said upper housing pivots up and away from connector body in counter-clockwise rotation.

9. A fiber optic connector body of claim 1, wherein said upper housing is a first housing portion and said lower housing is a second housing portion, said first and second housing portion form the connector body.

* * * * *